June 21, 1960 F. SCHAUB 2,941,310
TREATMENT OF GRAIN
Filed May 16, 1956 4 Sheets-Sheet 1

INVENTOR
FRANZ SCHAUB

By Burgess, Dinklage & Sprung
ATTORNEYS

United States Patent Office 2,941,310
Patented June 21, 1960

2,941,310

TREATMENT OF GRAIN

Franz Schaub, Oberhausen-Holten, Germany, assignor to Ruhrchemie Aktiengesellschaft, Oberhausen-Holten, Germany, a corporation of Germany Filed May 16, 1956, Ser. No. 585,263

Claims priority, application Germany May 16, 1955

17 Claims. (Cl. 34—65)

This invention relates to new and useful improvements in the treatment of grain. The invention more particularly relates to an apparatus and method for drying, purifying and cooling grain.

The invention and its objects will become apparent from the following description read in conjunction with the drawings in which.

Figure 1:
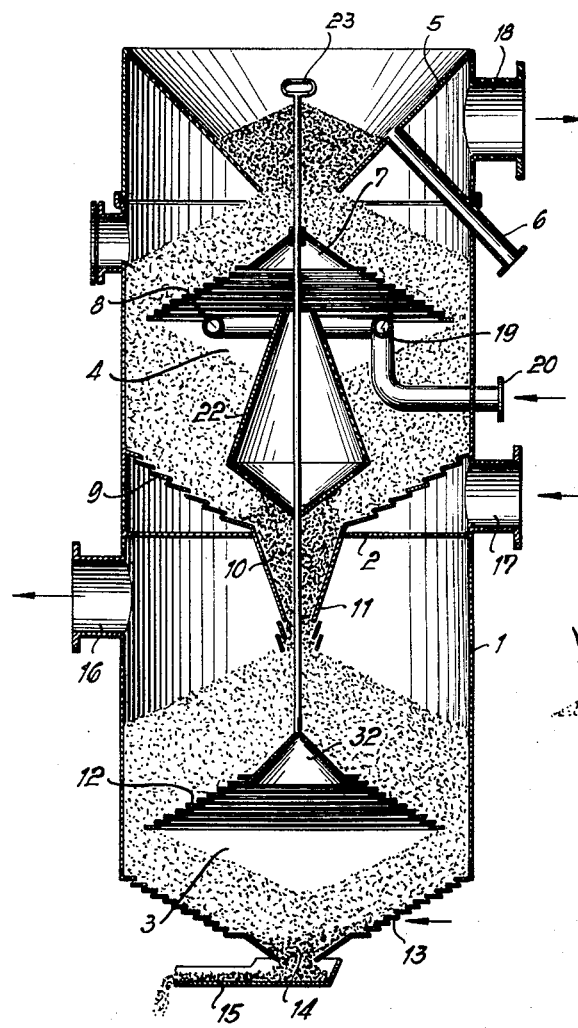
Fig. 1 is a diagrammatic vertical section of an embodiment of a portion of the treating apparatus in accordance with the invention.
Figure 4:
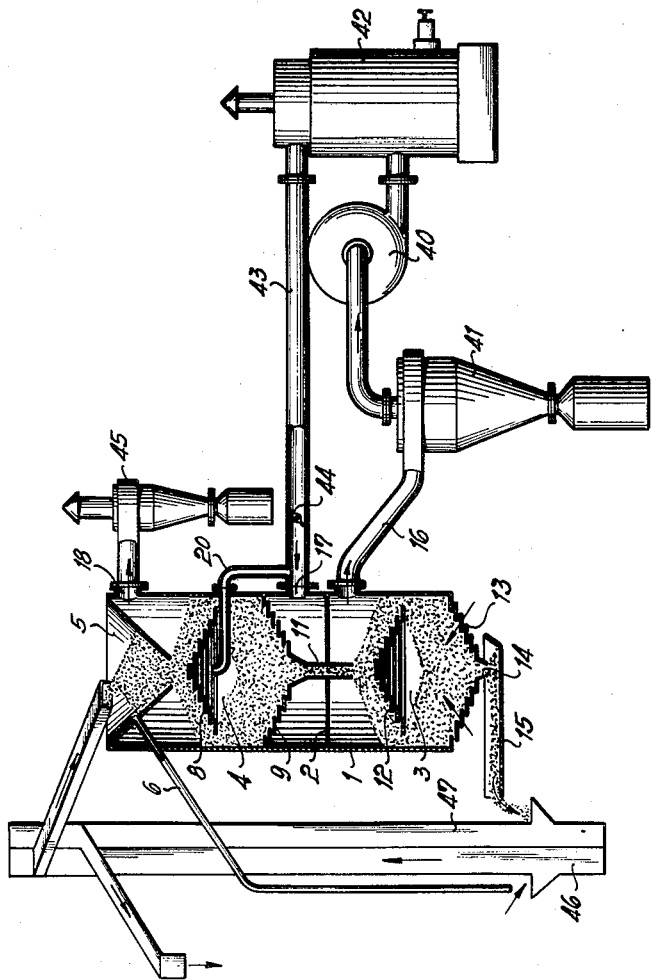
Figure 5:
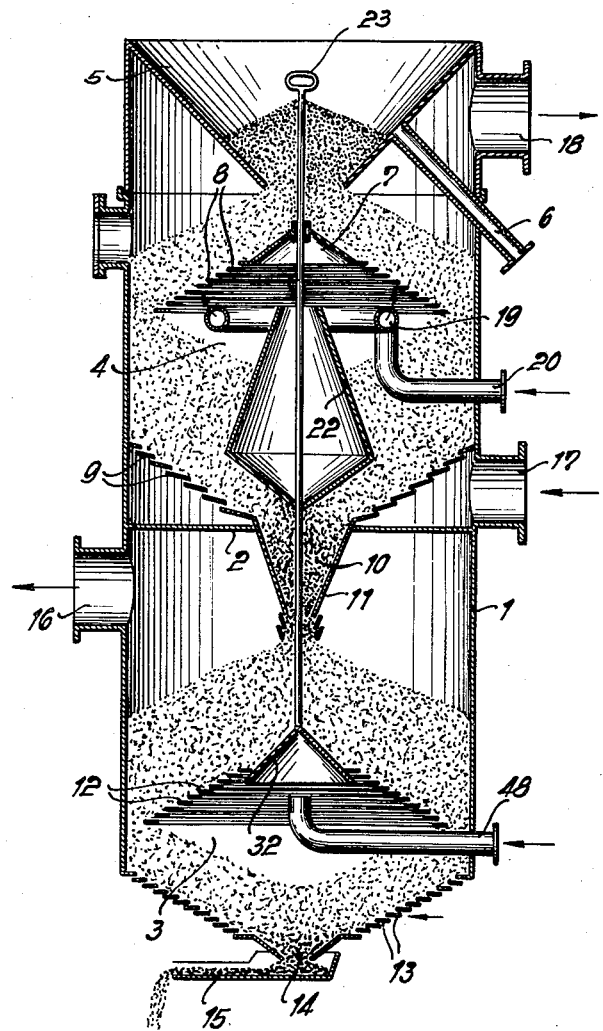

Fig. 4 diagrammatically shows an embodiment of an entire apparatus for treating grain in accordance with the invention; and Fig. 5 is a diagrammatic vertical section of the apparatus in accordance with Fig. 1 with a modified inlet of the gases used for the cooling.

Referring to Fig. 1, 1 is a cylindrical casing of, for example, round cross section which, by an intermediate bottom 2, is subdivided into two superimposed sections. The lower section of the apparatus houses the cooling chamber 3 while the upper section includes the drying chamber 4 in which the preheating of the grain is also effected.

The grain to be treated is fed at the top of the apparatus by a funnel 5 provided with a lateral outlet pipe 6. In this manner, a certain degree of filling is always attained which is dependent upon the level at which the outlet pipe 6 is attached.

With the aid of the cone-shaped surface 7, the grain drops from the funnel 5 on a cone-shaped grid surface 8 arranged in the drying chamber 4 and consisting, for example, of superjacent grid rings. In place of the grid surface which consists of a multiple number of annular superimposed grid rings of decreasing diameter, there may be used any known or conventional downwardly inclined gas-permeable support surface, i.e., surface over which solid divided material will flow but through which gas may pass. Thus, for example, in place of the grid surface, there may be used sieve plates, segmental grid plates, louvers, or the like. The depth of the grain layer travelling over the grid surface 8 is limited by the lower edge of the feed funnel 5. Near the inner wall of the container, the grains fall on a funnel-shaped grid surface 9. Here, the layer depth of the grain is determined by the lower edge of the grid 8. This grid surface, at its lowest point, has a central opening 10 which, with a conically constricted pipe 11, extends down into the cooling zone 3.

The cooling zone 3 is likewise provided with a cone-shaped grid surface 12 extending almost to the inner wall of the casing arranged under it is a funnel-shaped grid surface 13 which closes the casing at the bottom. The finally treated grain leaves the treating apparatus 1 at the lowest point of the grid surface 13 and is led off from the discharge opening by means of a suitable conveying device as, for example, by a shaking chute 15, a conveyor belt or a roll divided into chambers, such as a cellular or bucket wheel. The velocity of motion of these conveying devices determines the grain quantity flowing out per unit time and thus the load of the apparatus.

For the cooling of the grain travelling downwardly over the grid surfaces 12 and 13, air is drawn in by means of a pipe 16 attached in the upper part of the cooling chamber 3. This is effected by means of a suction fan or any other suitable air-conveying device. The air drawn in passes at a low temperature (room temperature) through the slots of the lower grid surface 13 and flows through the layer of grain supported by said grid surface. The air which gradually warms up then passes through the slots of the cone-shaped grid surface 12 and the grain travelling downward on the same. The air sucked off through the tubular outlet 16, while correspondingly increasing its temperature, has absorbed the amounts of heat removed from the cooled grain. Because of the improved sifting and purifying action obtained in the dry grain, it is also loaded with impurities such as parts of husks.

The effluent cooling air is freed from entrained dust portions, husks and light weed seeds by means of suitable devices as, for example, in a cyclone or filter, and thereafter, passes through a compressor and a heating device as described in further detail below. The air which has been purified and sufficiently heated in this manner is introduced through the pipe 17 below the funnel-shaped grid surface 9 into the drying chamber 4. Here, it passes at first through the grain layer travelling downwardly over the grid surface 9. Thereafter, it passes through the grain on the uppermost grid surface 8 to preheat the same. After the passage through the grain layers on the two grid surfaces 9 and 8, the air which has been correspondingly cooled by delivering the heat required for evaporating the water and preheating the grain and which is substantially saturated with water vapor leaves the apparatus through a tubular nozzle 18. The impurities and husks discharged at this point may be separated in a subsequent cyclone.

Below the grid surface 8 there may be arranged an annular line 19 provided with nozzles, into which a partial stream of hot drying air enters through pipe 20. Thus, the cooled and saturated air flowing off from the grain layer on the grid 9 is heated and again rendered capable of being used for drying.

Figure 2:
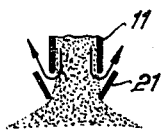
Fig. 2 is a diagrammatic vertical section showing in further detail a portion of the apparatus of Fig. 1.

If the air used for cooling is drawn through the cooling zone and, after purification and preheating, is forced at an elevated pressure into the drying chamber, then a pressure gradient is present between the cooling zone 3 and the drying zone 4. For this reason, a small part of the air present in the drying chamber 4 flows through the grain discharge pipe 11 into the cooling chamber 3. Within the cooling zone, these quantities of air must not cause a whirling-up of the grain layer travelling downwardly over the grid 12. Therefore, the discharge nozzle 11 is provided with one or several upwardly inclined slots 21 as shown in Fig. 2. The air leaving here due to the differential pressure prevailing between the drying chamber and the cooling chamber cannot disturb the subjacent layer of grain since it is directly drawn off through the nozzle 16.

If desired, a small partial stream of the air used for drying may be introduced below the conically-shaped grid 12 located in the cooling zone. By means of this partial stream, the cooling air which has already been preheated by the grain layer travelling over the grid surface can still further be heated. Under these circumstances, a mild final drying rather than a cooling of the grain takes place in the uppermost layer of the cooling zone 3.

When heating the drying air at several heating points, it is preferable to reduce the cross-section of the layer being dried on the funnel-shaped grid. This can be achieved by locally constricting the cross-section of the casing, or preferably by the use of a displacer 22 which can be moved by means of a rod 23 having guides within the stationary cone-shaped grid 7.

By lowering the displacer, the discharge opening 10 may be covered thereby completely shutting off the outflow from the drying chamber 4. In this case, a batchwise drying of the grains charged can be effected as it may be useful, for example, in starting up the apparatus according to the invention. It is possible in this manner to dry and cool also relatively small quantities of grain. For this batchwise operation, the velocity of the drying or cooling air may be sufficiently increased to obtain a whirling motion of the grains.

If grain with a very high moisture content is involved, it may be necessary to effect the drying in several successive drying processes to avoid excessive temperatures. Since a subsequent cooling after each of the drying processes would be disadvantageous in this case, it is possible with the device according to the invention, by lowering the conical surface 32, to directly discharge the hot grain from the apparatus without allowing the same to travel over the grid surfaces 12 and 13. The sealing cone 32 may be rigidly connected with the rod 23 so that it necessarily moves together with the displacer 22. Three different settings are possible: The normal continuous drying and cooling is effected with the displacer 22 in the highest position and no opening between the cone 32 and the grid 12. Continuous drying is likewise still possible with the displacer in an intermediate position. In this case, however, the passage between the cone 32 and the grid 12 is already open. In batchwise drying, the displacer 22 is used in its lowest position with the opening 10 being completely closed.

According to Fig. 1, the air flowing off through the grid 9 and the grain layer on the same is directly used for warming the grain layer on the grid 8. The preheating is under these circumstances, effected with the drying air which is largely enriched with water vapor. A part of the water vapor driven out in the drying operation condenses on the incoming cold grains. Thereby, the water evaporation heat is supplied to these grains. This preheating with moist warm air effects a particularly careful treatment of the entering grain and at the same time a softening of the shells of the grains. In this manner, the passage of the moisture of the grains through the grain shells, which is required in the drying, is substantially facilitated. Since the heat exchange between the grain and the condensing water vapor of the outflowing drying air is extremely intensive, the residence time on the preheating grid 8 may be relatively short so that layer depths of, for example, 30 to 40 centimeters will be sufficient on this grid.

The saturated drying air flowing off from the grain layer travelling over the grid 8 may, however, also act in indirect heat exchange contact on the incoming moist grain. This is achieved by means of the device shown in Fig 3.

In this case, tubes 25 or similar heat exchange elements are run through the feed funnel 24 for the moist grain and remove the spent drying air in upward direction. The condensed water separating from this air upon cooling is accumulated by a trap 26 and removed from the drying apparatus through pipe 27.

Figure 3:
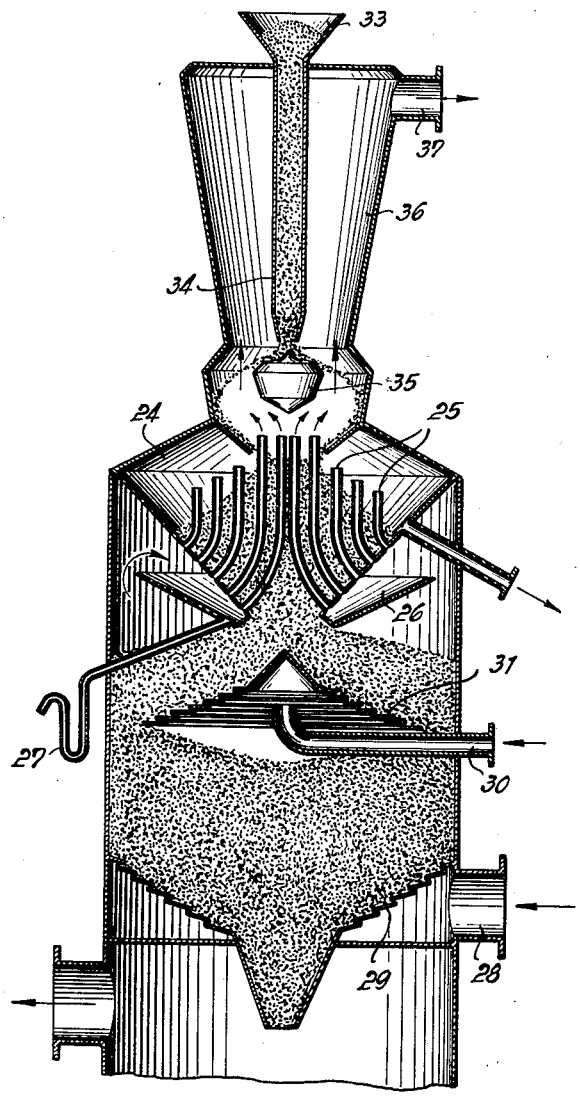
Fig. 3 is a diagrammatic vertical section of a portion of a still further embodiment of an apparatus in accordance with the invention.

In the case of the arrangement according to Fig. 3, the bulk of the drying air is blown in through the tubular inlet 28 below the funnel-shaped grid 29 and a partial stream of the drying air is blown in through the tubular nozzle 30 directly below the superjacent cone-shaped grid.

The drying air which, in the case of the arrangement according to Fig. 3, flows off from the pipes 25 may be subsequently used for sifting the incoming grain. It is possible thereby to largely remove impurities in dust form and weed seeds even from moist grain. In this case, the grain to be treated is fed through the funnel 33 which is extended in downward direction by a feed pipe terminating above a distributing body 35. The grain flows in a thin layer downwardly over the surface of the body 35 while the drying air flowing in upward direction is blown through it. In the sifting chamber 36, the lighter constituents separate from the heavier grains which fall in downward direction while the air loaded with the lighter constituents flows off through a tubular nozzle 37.

It can be seen from the overall arrangement of the auxiliary devices required for the operation of the grain dryer according to the invention and diagrammatically shown in Fig. 4 that the air entering from below through the grid surface 13 is drawn in by a blower 40. The air stream leaving through line 16, before going to the blower, is passed through a cyclone 41 where entrained husks, weed seeds and portions in dust form are retained. The air which is practically free from solid constituents is forced by the blower 40 into an air heater 42. From here, it is passed through a pipe 43 and into the drying zone. The line 43 may be equipped with a damper 44. A part of the air, through branch line 20, is directly blown in below the uppermost cone-shaped grid of the drying zone.

The air flowing off through pipe 18 from the drying apparatus may be freed from impurities in dust form in a subsequent cyclone 45 before escaping to the atmosphere. The excess material led off from the charging funnel through line 6 is passed to the elevator 46 which conveys the grain to be treated through a chute into the charging funnel 5. The dried and cooled grain may be passed by the elevator 47 into the warehouse.

The uppermost grain layer travelling down over the grid surface 8 needs generally to be only half as deep as the actual layer to be dried on the grid surface 9. The grain layers travelling downwardly on the cooling grids 12 and 13 are together about half as deep or just as deep as the grain layer travelling downwardly over the grid surface 9.

If the cold air required for cooling the grain which is still hot after drying is to be introduced below the conical grid surface 12, the embodiment represented in Fig. 5 of the apparatus shown in Fig. 1 will be used. The characters in this Fig. 5 correspond to those used in Fig. 1.

The preheating and drying of the grain entering through the funnel 5 and travelling downwardly over the grid surfaces 8 and 9 is effected in the upper section 4 of the casing 1. The hot air required for drying is passed in below the upper grid surface by means of an annular line 19 from line 20. Moreover, additional hot air may be blown in below the grid surface 9 by means of line 17. After the passage through the grid surfaces 9 and 8, the quantities of air introduced leave the apparatus through the tubular nozzle 18. The devices 6, 7, 22, and 23 required for controlling the quantities of grain charged and the level in the funnel 5 are the same as those used for the apparatus according to Fig. 1.

The cooling of the dried grain is effected below the intermediate bottom 2. During the cooling, the grain travels downwardly over the grid surfaces 12 and 13 and drops from an opening 14 onto a shaking chute 15 by means of which the quantity of grain discharged per unit time may be controlled. The transfer of the dried grain from the drying chamber 4 into the cooling chamber 3 is effected by means of the funnel 11.

A blower drawing cold air through the grid surface 13 is connected to the tubular nozzle 16 in the manner shown in Fig. 4. This air first flows over the grid surface 13 and then through the grain travelling downwardly over the grid surface 12. In addition to the device shown in Fig. 1 provision is made for a line 48 by means of which cold air can be blown in directly below the conical surface 32. This air is distributed below the grid surface 12 and then flows through the same in upward direction. By means of the air introduced through line 48, the degree and rate of cooling of the hot grain can be determined.

In the drying chamber 4, the layer depth of the grain on the grid surface 8 is about 300-600 mm. The layer depths used on the lower grid surface 9 of the drying chamber are preferably 300-800 mm. while those on the grid surfaces 12 and 13, in the cooling chamber, are 150-400 mm. The values given for the layer depths of the grain being treated may be somewhat higher or lower. Layer depths of less than 50 mm. and more than 1000 mm., however, should be avoided because the distribution of the gases used for the treatment of the grain will not be uniform or the load of the lower grain layers will be too high in these cases.

As may be seen from the above, the grain is passed through the cooling and heating chambers in the form of a contiguous body having an appreciable layer height over the grid surfaces as contrasted to a thin stream or cascade. The treating gas is preferably passed upward through the chambers and grid surfaces at a velocity which substantially cancels the weight of the layers of grain on the grid surfaces without entraining the grain. This causes a novel contacting effect with extremely uniform contacting between the upwardly moving gas stream and the individual grain particles and avoids an uneven contacting caused by channelling or the like. The gas is preferably passed through the grain at a flow velocity of about 0.5 to 1.0 meter per second. The optimum flow rate of the air is, however, dependent upon the particle size of the grain being treated. This flow rate is best chosen so that it amounts to 60 to 90% of the rate required for completely whirling up the grain being treated.

At the air flow rates given above, particularly in connection with the cooling of the dried grain an intensive sifting and purifying action is obtained as the air passes through the warm, dried grain thus removing and entraining dust, husks and weed seeds. In this manner, a special purification of the grain generally is not required and the drying, purification and cooling is basically effected in a single operation so that the grain emerging from the apparatus in accordance with the invention, may be directly passed into the warehouse, elevator, or the like for storage, or may be directly ground.

The maximum temperature to which the grain may be heated should not exceed about 50° C. since higher temperatures may have a detrimental influence on the germinating power and/or the baking quality of the grain.

The throughput of the apparatus in accordance with the invention can be controlled by controlling the rate of discharge which is preferably effected by conveying devices known per se. Care should be taken that the quantity of inflowing grain is always somewhat larger than corresponds to the quantity processed so that this excess quantity flows through the overflow pipe 6 and is returned into the processing cycle.

The following example is given by way of illustration and not limitation:

Moist rye grains in amount of 2000 kilograms/hr. were treated in an apparatus according to the invention having a diameter of 150 cm. and a length of 370 cm. and being divided into an upper drying zone and a lower cooling zone. The rye contained 20.3% of moisture and was dried down to a residual water content of 15.9% of $H_2O$. The quantity of air used for drying and the subsequent cooling was 3700 normal cubic meters per hour.

The grain to be treated was fed at the top of the apparatus at a temperature of 5° C. While passing through the drying zone, it warmed up to 45-50° C. and left the cooling zone of the apparatus at 13-15° C. with the ambient room temperature being about 10° C. In the drying zone, the total layer depth of the grain was about 900 mm. It was subdivided into two sections. A partial stream of about 20% of the quantity of air rising from the lower section of the drying zone was passed to the upper section at a temperature of 95° C.

The air used for cooling and then for drying was sucked in at a temperature of 10° C. through the lowermost grid of the cooling zone. The relative humidity of the air drawn in was about 80%. In the cooling zone and in the following blower sucking the air through the cooling zone and discharging it into the drying zone, the air was already heated to 50° C. In the subsequent indirectly operating air heater heated with heavy oil the air temperature was increased by further 40-50° C. Thereafter, the air streamed through the drying zone and left the uppermost grain layer at a temperature of about 32° C.

The grain to be treated had a degree of purity of about 88% as it entered the apparatus of the invention. After the passage through the cooling zone and when leaving the apparatus the grain had a degree of purity of 97.5% so that a subsequent purification of the material was no longer required. Most of the impurities and husks were removed from the cooling zone and separated by means of the cyclone arranged between the cooling zone and the blower.

While the invention has been described in detail with reference to the specific embodiment shown, various changes and modifications will become aparent to the skilled artisan which fall within the spirit of the invention and scope of the appended claims.

I claim:

1. In an apparatus for drying, purifying and cooling grain having means defining a cooling chamber, means defining a heating chamber positioned above said cooling chamber, a grain inlet defined through the upper portion of said heating chamber, a first downwardly inclined gas-permeable support surface positioned in said heating chamber below said grain inlet, a grain outlet defined through the lower portion of said heating chamber leading into the upper portion of said cooling chamber, a second downwardly inclined gas-permeable support surface positioned in said heating chamber below said first support surface defining a path of flow for grain after passage over said first support surface to said grain outlet, a third downwardly inclined gas-permeable support surface positioned in said cooling chamber below said grain outlet, outlet means for removing grain from the lower portion of said cooling chamber, a fourth downwardly inclined gas-permeable support surface positioned in said cooling chamber below said third support surface defining a path of flow for grain after passage over said third support surface to said outlet means, means for passing a cooling gas upwardly through said cooling chamber through said fourth and third support surfaces out of the upper portion of said cooling chamber the improvement which comprises means for passing a heating gas into said heating chamber below said second support surface, means for passing a separate stream of heating gas into said heating chamber below said first support surface and means for varying the quantity of grain passing over said second support surface.

2. Apparatus according to claim 1, in which said means for varying the quantity of grain passing over said second support surface comprises an axially movable displacer body positioned above said second support surface and means for adjusting the vertical position of said displacer with respect to said second support surface.

3. Apparatus according to claim 2, in which said displacer body is dimensioned to seal said grain outlet upon contact therewith.

4. Apparatus according to claim 1, in which said means for passing the separate stream of heating gas upwardly through said first support surface includes an annular gas line having a multiple number of gas outlet openings distributed over its length positioned below said first support surface.

5. Apparatus according to claim 1, including means for separating entrained material from the gas being passed from said cooling chamber, means for heating the gas and means for passing the gas through said heating chamber.

6. Apparatus according to claim 1 in which the lower side of said support surface is in communication with the ambient atmosphere and in which said means for passing the gas through said chambers includes a first gas outlet defined at the upper portion of said cooling chamber above said third support surface, a gas inlet defined at the lower portion of said heating chamber below said second support surface and a second gas outlet defined at the upper portion of said heating chamber above said first support surface, a gas flow conduit connecting said first gas outlet and said gas inlet and blower means positioned in said gas flow conduit for sucking gas from said cooling chamber through said first gas outlet and forcing the gas at an increased pressure into said gas inlet.

7. Apparatus according to claim 4 in which said means for separating entrained material comprises a dust separator connected in said gas flow conduit and said means for heating comprises a heater connected in said gas flow conduit.

8. Apparatus according to claim 7 in which said first and third support surfaces are conically shaped support surfaces and said first and fourth support surfaces are funnel shaped support surfaces with all said support surfaces being positioned in substantially vertical alignment and said fourth support surface defining the bottom of said heating chamber.

9. Apparatus according to claim 8 in which said chambers are defined by a substantially cylindrical casing subdivided by a substantially horizontal partition into said heating and cooling chambers.

10. Apparatus according to claim 9 including a funnel-shaped storage container connected to said grain inlet and an overflow pipe connected to said storage container for maintaining a predetermined filling level therein.

11. Apparatus according to claim 3 in which said third support surface has a central opening defined therethrough and including a conically shaped sealing member axially movable in said cooling chamber between a position in contact with said third support surface sealing the same and a position spaced below said third support surface freeing said central opening.

12. Apparatus according to claim 11 including a rod connected for moving actuation of said displacer body and sealing member where upon downward movement of said rod said displacer body seals said grain outlet and said sealing member is spaced from said central opening and upon upward movement of said rod said displacer body is positioned spaced from said grain outlet and said sealing member seals said central opening.

13. Apparatus according to claim 12 in which said grain outlet includes a discharge pipe extending into said cooling chamber and defining upwardly directed slots at its lower end.

14. Apparatus according to claim 13 including a multiple number of heat exchange pipes extending through said storage container and in communication with the upper portion of said heating chamber.

15. Apparatus according to claim 14 including a sifting chamber having a gas outlet connected above said storage container, at least a portion of said heat exchange pipes terminating in said sifting chamber, means for passing grain into said sifting chamber for passage into said storage container, and means for deflecting grain passing through said sifting chamber into a thin cascade above said heat exchange pipes.

16. Apparatus according to claim 15 including liquid trap means for removing moisture condensing in said heat exchange pipe.

17. Apparatus according to claim 1 including means for passing heated gas under said third support surface.

References Cited in the file of this patent

UNITED STATES PATENTS

| 1,936,866 | Van Ackeren | Nov. 28, 1933 |
| 2,469,424 | Wood et al. | May 10, 1949 |
| 2,622,342 | Goulounes et al. | Dec. 23, 1952 |
| 2,766,534 | Schaub et al. | Oct. 16, 1956 |

FOREIGN PATENTS

| 263,637 | Switzerland | Dec. 1, 1949 |